Patented May 9, 1939

2,157,767

UNITED STATES PATENT OFFICE 2,157,767

BASIC METAL SALTS AND PROCESS OF MAKING

Kenneth E. Long, South Euclid, Ohio, assignor to The Harshaw Chemical Company, Elyria, Ohio, a corporation of Ohio No Drawing. Application April 14, 1934, Serial No. 720,658

10 Claims. (Cl. 260—439)

Organo-metallic compounds commercially available as driers in the paint, varnish and printing ink trade, etc., are slightly acid, or at best neutral. Such driers when dissolved in paint solvents or thinners often have a tendency to thicken or jell and the presence of organic acid tends to overcome this jelling, but acidity has the serious drawback of tending to slow the drying of paint. A high metallic content is universally admitted as desirable in a drier, but heretofore it has not been commercially possible to obtain other than acid or neutral compounds, the metallic content being correspondingly low. Customarily, manufacturing procedure involves double decomposition of a soluble metallic salt with an alkali metal soap of such organic acids as linseed acids, those acids derived from oil or oil acids, rosin, etc., or else a direct combination of the hydrate, oxide, acetate, etc. of the metal with the fatty acid in a fusion treatment. The first-named procedure yields slightly acid or neutral compounds, while the fusion process tends to produce quite highly acid products. A process capable of producing drier compounds with high metal content or basic character, and particularly with such difficulty manipulable materials as cobalt, manganese, etc., is accordingly of fundamental importance and a much desired feature in the art.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the present invention, a metal, particularly of lower molecular weight than lead, such as cobalt, zinc, manganese, etc., is combined with an organic acid such as to attain a higher metal content than the combining equivalent of the acid, or in other words, the formation of a basic salt. Such metals may be concisely designated "dried metals." The organic acids employed are oil acids, such as linseed oil acids, corn oil acids, oleic acid, etc., and those acids derived from oils of the petroleum order, such as naphthenic acids, acids formed by oxidation of petroleum products, etc., also resin acids, rosin, rosin oil acids, etc. All such acids may be concisely designated as "oil acids and resin acids."

In general, I react upon an inorganic salt of a drier metal, such as cobalt, zinc, manganese and the like, with an oil acid or resin acid, with the proportions and conditions such as to bring about a combination in which the metal is in excess of the acid normal combining equivalent. Where operating with some materials, it is advantageous as a further refinement of the invention to in some instances carry on the reaction between the metallic inorganic compound and the oil acid together with a high boiling organic liquid of what may be termed solvent character. For instance, a liquid of boiling point of 150° C. to 250° C. Such high boiling liquid may also desirably act as a sweeping agent to remove water of reaction. Water is eliminated, and the product remains stable, notwithstanding the basic character or excess of metal in the combination. Among the high boiling liquids which may be used are mineral oil, mineral spirits, kerosene, coal tar solvents, naphtha, etc.

As an example: About 20 parts of zinc oxide and about 86 parts of naphthenic acid of acid value about 250 are mixed and heated slowly. Reaction begins at about 70° C. and is completed between 130° and 140° C., heating being carried to the point, slightly higher if necessary, to insure removal of all water formed. Reaction is complete in about 2 hours. The product is a basic zinc naphthenate containing about 16 per cent zinc. By suitable proportion of materials, an even higher zinc content which cuts in paint solvents to form a clear solution may be obtained.

As another example: About 25 parts of zinc oxide is made into a slurry with 20 parts of petroleum naphtha, and mixed with about 82 parts of naphthenic acid (acid value about 250). The mixture is heated slowly, and reaction begins at about 70° C. and is completed at about 130 to 140° C. Further heating to about 150° C. is however advisable, to make sure that the reaction is complete, and water is driven off. The resulting zinc naphthenate contains about 20 per cent zinc, and the product can be cut while still sufficiently hot with solvents if desired, to form a conveniently-handled liquid product containing 16 per cent zinc.

As another example: About 24.2 parts of cobalt hydroxide are mixed with about 85 parts of naphthenic acid (having an acid number 250) and the temperature is slowly raised to about 180 to 200° C., care being taken that all water formed is eliminated. The basic cobalt naphthenate product contains about 15 per cent cobalt, more than the combining equivalent of the acid. The product, if desired in liquid form, may be dissolved or thinned with petroleum naphtha, coal tar naphtha, xylol, etc.

As another example: About 32 parts of cobalt hydroxide (containing 62 per cent cobalt) is wet with about 10 parts of liquid such as coal tar naphtha, mineral spirits, kerosene, etc., and is mixed with about 81 parts of naphthenic acid, the mixture is gradually heated up to 200° C., and water formed is eliminated. By cooling slightly, to 150 to 160° C., the basic cobalt naphthenate containing about 19 per cent cobalt can be thinned with for instance a benzene type solvent, to a liquid product containing about 12 per cent cobalt.

As another example: About 84 parts of rosin, 18.5 parts of cobalt hydroxide, and 20 parts of a liquid such as kerosene, coal tar naphtha, etc., are gradually heated up to 190 to 200° C., or until reaction is completed and all water of reaction is driven off. The product is allowed to cool to about 160° C. and may be thinned with petroleum naphtha, coal tar naphtha, etc. to a liquid preparation which is very stable, miscible with paint materials, and of blue color.

Mixtures of compounds may also readily be made, as for instance by employing two or more metallic inorganic salts in calculated proportion to give the desired basic drier product, with the oil acid or resin acid, the materials being heated to complete the reaction and eliminate water.

A particular advantage of products in accordance with the present invention is the ability to attain a very high metal content, and in liquid form if desired, such product being compatible with paint, varnish and printing ink materials generally, without either a tendency to jell or interfere with rapid drying. In fact, the present products are particularly characterized by rapid drying action. Again, in the case of the cobalt compounds as above-noted, by reason of the especially high metal content, a particularly dense blue color is obtained, and on admixture with linseed oil compositions, the yellow tendency thereof may be agreeably modified or whitened.

Other modes of applying the principle of the invention may be employed, change being made as regards the details described, provided the features stated in any of the following claims, or the equivalent of such, be employed.

I therefore particularly point out and distinctly claim as my invention:—

1. A process of making metal drier salts, which comprises heating more than a normal combining equivalent of an inorganic compound from the group consisting of oxides and hydroxides of a drier metal of lower molecular weight than lead with an organic monobasic carboxylic acid forming an oil-soluble salt, and a high boiling water-sweeping liquid.

2. A process of making metal drier salts, which comprises heating more than a normal combining equivalent of a cobalt compound from the group consisting of oxides and hydroxides with an organic monobasic carboxylic acid forming an oil-soluble salt, and eliminating water.

3. A process of making metal drier salts, which comprises heating more than a normal combining equivalent of a cobalt compound from the group consisting of oxides and hydroxides with an organic monobasic carboxylic acid forming an oil-soluble salt, and a high boiling water-sweeping liquid.

4. A process of making metal drier basic salts, which comprises heating below 100° C. naphthenic acid and more than a normal combining equivalent of cobalt in the form of a compound from the group consisting of oxides and hydroxides, and further heating to above 100° C. to eliminate water.

5. A process of making metal drier basic salts, which comprises heating below 100° C. a resin acid and more than a normal combining equivalent of a drier metal of a lower molecular weight than lead in the form of a compound from the group consisting of oxides and hydroxides of the metal and a high boiling water-sweeping liquid.

6. A process of making metal drier basic salts, which comprises heating below 100° C. a resin acid and more than a normal combining equivalent of cobalt in the form of a compound from the group consisting of oxides and hydroxides of the metal, and further heating to above 100° C. to eliminate water.

7. A basic salt consisting of more than a normal combining equivalent of cobalt combined with an organic nonbenzenoid monobasic carboxylic acid forming an oil-soluble salt.

8. A basic salt consisting of more than a normal combining equivalent of cobalt with naphthenic acid.

9. A basic salt consisting of a drier compound the reaction product of heating more than one normal combining equivalent but less than two equivalents of a drier metal of atomic weight less than lead and not lower than cobalt with an organic non-benzenoid monobasic carboxylic acid.

10. A basic cobalt salt of naphthenic acid, consisting of more than one combining equivalent weight of cobalt to each combining equivalent weight of naphthenic acid but not substantially over such proportion as involved in a ratio of about 32 parts of cobalt hydroxide to 81 parts of naphthenic acid of acid number about 250, and being thereby basic but below maximum possible basicity.

KENNETH E. LONG.